(12) United States Patent
Hall

(10) Patent No.: US 8,701,868 B2
(45) Date of Patent: Apr. 22, 2014

(54) AGRICULTURAL SYSTEM FOR CONVEYING PRODUCT TO A HOLDING CONTAINER

(75) Inventor: Kevin Norman Hall, Saskatoon (CA)

(73) Assignee: CNH Canada, Ltd., Saskatoon, Saskatchewan (CA)

( * ) Notice: Subject to any disclaimer, the term of this patent is extended or adjusted under 35 U.S.C. 154(b) by 51 days.

(21) Appl. No.: 13/273,084

(22) Filed: Oct. 13, 2011

(65) Prior Publication Data

US 2013/0092509 A1   Apr. 18, 2013

(51) Int. Cl.
*A01D 90/00* (2006.01)
*A01C 15/00* (2006.01)

(52) U.S. Cl.
CPC ............ *A01C 15/003* (2013.01); *A01C 15/006* (2013.01)
USPC ........ 198/581; 198/313; 198/316.1; 198/668; 414/426

(58) Field of Classification Search
USPC ...................... 198/313, 316.1, 581, 586, 668; 414/487–488, 502–505, 526
See application file for complete search history.

(56) References Cited

U.S. PATENT DOCUMENTS

| | | | |
|---|---|---|---|
| 800,762 A * | 10/1905 | Otto ................................ | 191/87 |
| 2,773,586 A | 12/1956 | Schmidtke | |
| 2,834,487 A | 5/1958 | Gaddis | |
| 3,154,189 A * | 10/1964 | O'Hanlon et al. ............ | 198/311 |
| 3,337,068 A | 8/1967 | Meharry | |
| 3,435,941 A | 4/1969 | Mayrath | |
| 3,498,483 A | 3/1970 | Meharry | |
| 4,391,364 A | 7/1983 | Young et al. | |
| 4,540,086 A | 9/1985 | David et al. | |
| 4,669,945 A | 6/1987 | Pollard et al. | |
| 4,941,586 A | 7/1990 | Tarna | |
| 4,963,066 A * | 10/1990 | Boppart ......................... | 414/376 |
| 5,044,867 A | 9/1991 | Pettijohn | |
| 5,184,715 A * | 2/1993 | Feterl ............................. | 198/667 |
| 5,305,866 A * | 4/1994 | Stewart et al. ................ | 198/311 |
| 5,529,455 A | 6/1996 | Kaster et al. | |
| 5,718,556 A | 2/1998 | Forsyth | |
| 5,788,055 A * | 8/1998 | Stewart et al. ................ | 198/671 |
| 5,829,949 A | 11/1998 | Brown | |
| 6,068,103 A | 5/2000 | Werner | |
| 6,283,269 B1 * | 9/2001 | Mayer ........................... | 198/313 |
| 6,860,700 B2 | 3/2005 | Powell et al. | |
| 7,267,519 B2 | 9/2007 | Cresswell et al. | |
| 7,500,814 B2 | 3/2009 | Meyer | |
| 7,946,416 B2 * | 5/2011 | Grose et al. .................... | 198/671 |
| 2007/0079739 A1 | 4/2007 | Meyer | |
| 2010/0068021 A1 | 3/2010 | Petersen et al. | |
| 2011/0076123 A1 | 3/2011 | Beck | |
| 2012/0312662 A1 * | 12/2012 | Kowalchuk et al. .......... | 198/657 |
| 2013/0048465 A1 * | 2/2013 | Friesen .......................... | 198/313 |

OTHER PUBLICATIONS

U.S. Appl. No. 13/273,103, filed Oct. 13, 2011, Trevor Lawrence Kowalchuk.
International Search Report and Written Opinion mailed Feb. 14, 2013 for PCT/IB2012/055307 filed Oct. 3, 2012.
International Search Report and Written Opinion mailed Mar. 1, 2013 for PCT/IB2012/055306 filed Oct. 3, 2012.

\* cited by examiner

*Primary Examiner* — Mark A Deuble
(74) *Attorney, Agent, or Firm* — Rebecca L. Henkel

(57) ABSTRACT

An agricultural system for conveying product to a holding container is provided. One agricultural system includes a hopper configured to receive product and a conveyor configured to move the product from the hopper to a holding container. The hopper is configured to fold under the conveyor into a storage position that directs an opening in the hopper toward a soil surface.

20 Claims, 4 Drawing Sheets

AGRICULTURAL SYSTEM FOR CONVEYING PRODUCT TO A HOLDING CONTAINER

BACKGROUND

The invention relates generally to agricultural systems and, more particularly, to an agricultural system for conveying product to a holding container.

Generally, seeding implements are towed behind a tractor or other work vehicle. These seeding implements typically include one or more ground engaging tools or openers that form a seeding path for seed deposition into the soil. The openers are used to break the soil to enable seed deposition. After the seeds are deposited, each opener is followed by a packer wheel that packs the soil on top of the deposited seeds.

In certain configurations, an air cart is used to meter and deliver agricultural product (e.g., seeds, fertilizer, etc.) to ground engaging tools within the seeding implement. Certain air carts include a metering system and an air conveyance system configured to deliver metered quantities of product into an airflow that transfers the product to the openers. Air carts may also include a product conveying system for moving product from an external source (e.g., a truck, a storage container, etc.) into the air cart. The product conveying system may include a hopper for receiving the product, and a conveyer for moving the product from the hopper to a storage tank in the air cart. Certain product conveying systems include large hoppers to facilitate receiving product from both end-dump trucks and belly-dump truck. Unfortunately, large hoppers may be difficult to store and clean.

BRIEF DESCRIPTION

In one embodiment, an agricultural system includes a hopper configured to receive product and a conveyor configured to move the product from the hopper to a holding container. The hopper is configured to fold under the conveyor into a storage position that directs an opening in the hopper toward a soil surface.

In another embodiment, an agricultural system includes a hopper configured to receive product and a conveyor configured to move the product from the hopper to a holding container. The system also includes a folding assembly configured to fold the hopper under the conveyor into a storage position that directs an opening in the hopper toward a soil surface.

In a further embodiment, an agricultural system includes a hopper configured to transition between a working position that directs an opening in the hopper upwardly to facilitate receiving product, and a storage position that directs the opening in the hopper toward a soil surface to facilitate flow of the product out of the hopper. The system also includes a conveyor configured to move the product from the hopper to a holding container while the hopper is in the working position. The system includes a folding assembly configured to fold the hopper under the conveyor into the storage position.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
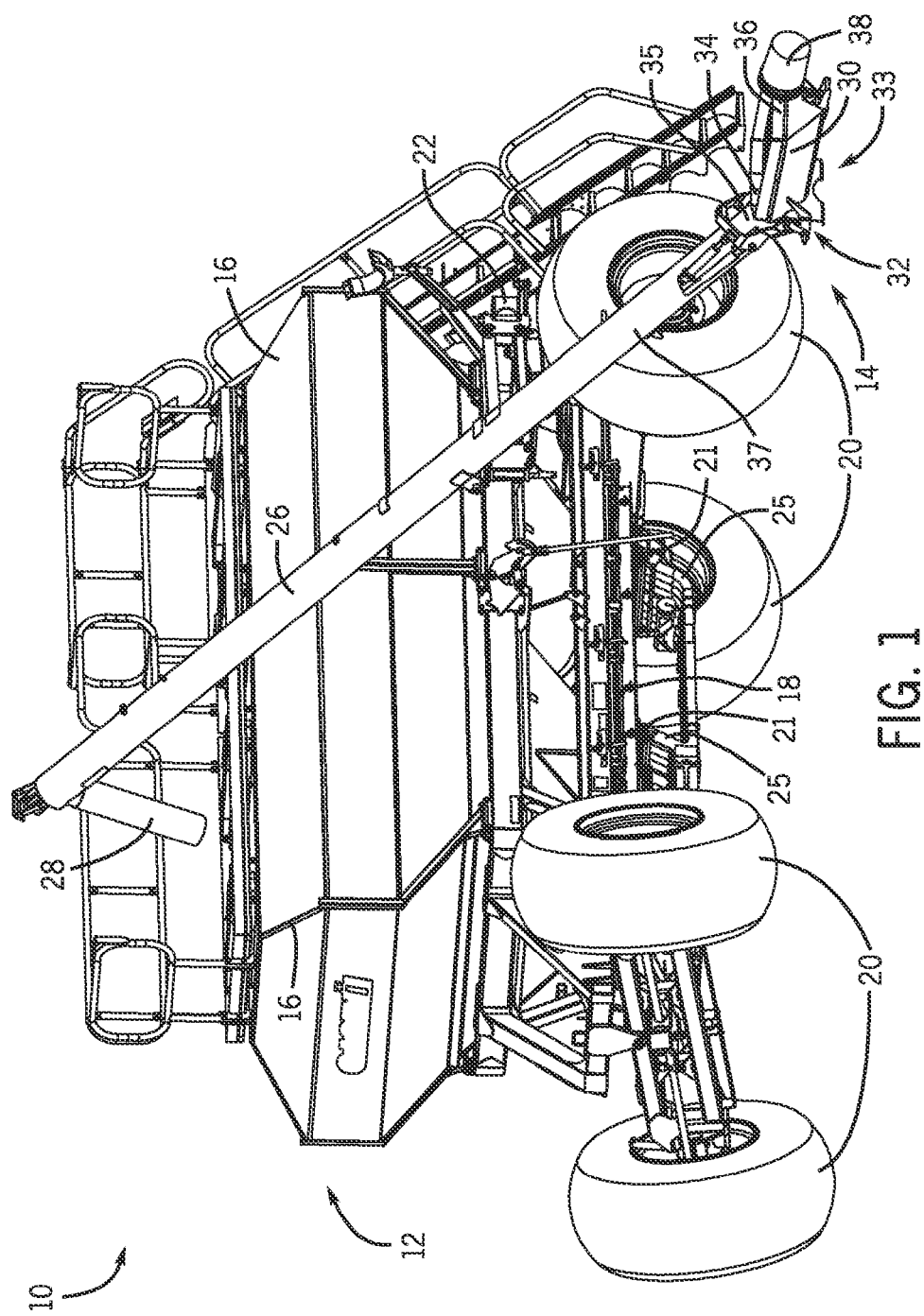
FIG. 1 is a perspective view of an agricultural system including an air cart having a product conveying system for moving product.

FIG. 1 is a perspective view of an agricultural system 10 including an air cart 12 having a product conveying system 14 for moving product from an external source to the air cart 12. The air cart 12 includes one or more storage tanks 16 (e.g., holding containers), a frame 18, wheels 20, one or more metering systems 21, and an air source 22. The frame 18 includes a towing hitch configured to couple the air cart 12 to an implement or tow vehicle. In certain configurations, the storage tanks 16 may be used for storing various agricultural products. For example, one compartment may include seeds, and another compartment may include a dry fertilizer. In such configurations, the air cart 12 may be configured to deliver both the seeds and fertilizer to an implement.

In certain embodiments, seeds and/or fertilizer within the storage tanks 16 are gravity fed into the metering systems 21. The metering systems 21 may include sectioned meter rollers to regulate the flow of product from the storage tanks 16 into an air flow provided by the air source 22. The air flow then carries the product through one or more hoses or conduits 25 to an implement, thereby supplying ground engaging tools of the implement with seeds and/or fertilizer for deposition into the soil.

The product conveying system 14 includes a product transporting tube or conveyor 26. The conveyor 26 includes a guide tube 28 coupled to one end, and a hopper 30 coupled to the other end. The product conveying system 14 is configured to move agricultural product from the hopper 30, through the conveyor 26 and guide tube 28, and into the storage tanks 16. As will be appreciated, the product may be introduced into the hopper 30 from a product transporting vehicle, such as an end-dump truck or a belly-dump truck.

During operation, a product transporting vehicle delivers the agricultural product into the hopper 30. The hopper 30 then transfers the product to the conveyor 26. For example, an auger in the hopper 30 may rotate to move the product to the conveyor 26. The conveyor 26 may also include an auger configured to receive product from the hopper 30, and to move the product to the guide tube 28, which directs the product into the storage tanks 16. In certain embodiments, the conveyor auger is coupled to the hopper auger such that rotation of the conveyor auger drives the hopper auger to rotate. In alternative embodiments, the hopper 30 may include a belt system configured to transfer product from the hopper 30 to the conveyor 26. Further, the conveyor 26 may include another belt system that interfaces with the belt system of the hopper 30. The conveyor belt system is configured to move the product from the hopper 30 to the guide tube 28, which directs the product into the storage tanks 16.

As illustrated, a folding assembly 32 is coupled to the conveyor 26 and to the hopper 30. The folding assembly 32 is configured to rotate the hopper 30 between a working position 33 (i.e., unfolded position) as illustrated in FIG. 1, and a storage position (i.e., folded position). With the hopper 30 in the illustrated working position 33, an opening in the hopper 30 is directed upwardly to facilitate receiving product. Conversely, while the hopper 30 is in the storage position, the opening is directed toward a soil surface to facilitate product flow out of the hopper 30. Furthermore, with the hopper 30 in the working position 33, a first side 34 of the hopper 30 is positioned adjacent to an end 35 of the conveyor 26, and a second side 36 of the hopper 30, opposite the first side 34, is positioned remote from the conveyor 26. Conversely, in the storage position, the hopper 30 folds under the conveyor 26 such that the first side 34 of the hopper 30 is positioned below the end 35 of the conveyor 26, and the second side 36 of the hopper 30 is positioned adjacent to a body portion 37 of the conveyor 26.

In this configuration, product remaining within the hopper 30 may fall toward the ground as the hopper 30 is rotated from the working position 33 to the storage position. Therefore, a pail 38 may be attached to hooks on the hopper 30 to catch product flowing from the hopper 30 as the hopper 30 is rotated from the working position 33 to the storage position. Consequently, product captured by the pail 38 may be reused, thereby reducing wasted product. Further, as will be explained in greater detail below, the second side 36 of the hopper 30 includes a v-shaped surface to channel product to exit the hopper 30 into the pail as the hopper 30 is folded from the working position 33 to the storage position under the conveyor 26 (e.g., while the opening of the hopper 30 is directed downwardly).

It will be appreciated that with the hopper 30 folded under the conveyor 26, leaves, dirt, or other environmental contaminants cannot enter the opening of the hopper 30 because the opening is facing downwardly. Further, with the hopper 30 folded under the conveyor 26, product does not fall from the conveyor 26 onto the hopper 30 or the folding assembly 32. Thus, the product, which may contain erosive components, will not erode components of the hopper 30 and folding assembly 32.

Figure 2:
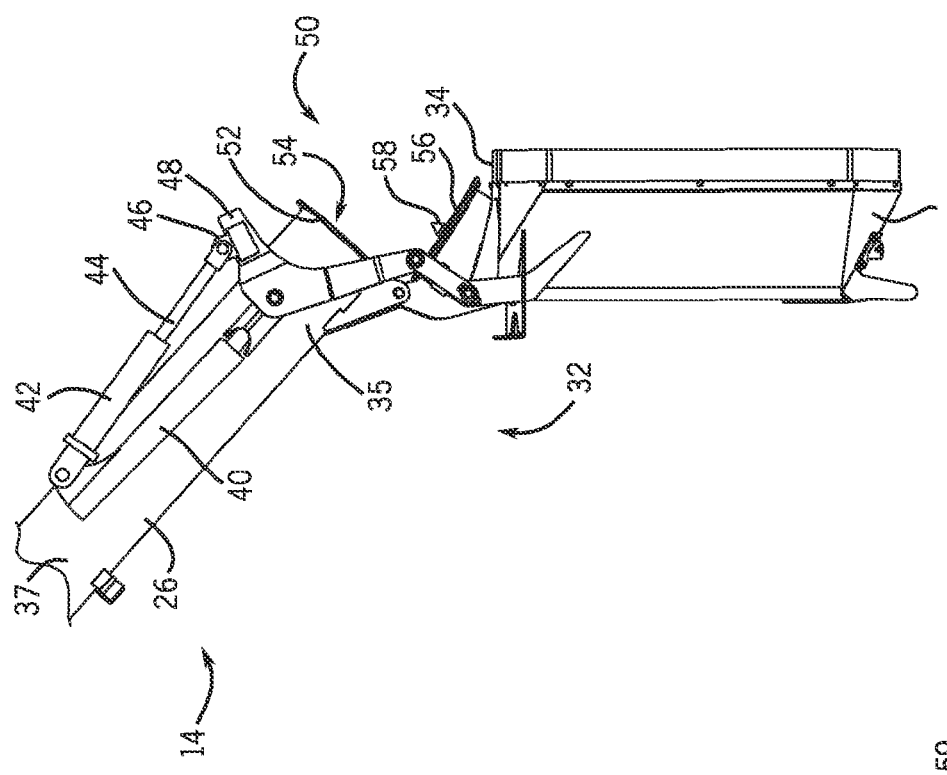
FIG. 2 is a side view of an embodiment of a product conveying system that may be employed within the air cart of FIG. 1, in which a hopper is in an intermediate position between a working position and a storage position.

FIG. 2 is a side view of the product conveying system 14 of FIG. 1, in which the hopper 30 is in an intermediate position between the working position 33 and the storage position. As previously discussed, the hopper 30 may be rotated between the working position 33 and the storage position via the folding assembly 32. In the illustrated embodiment, the folding assembly 32 includes at least one reinforcing plate 40. The reinforcing plate 40 is attached to the conveyor 26, and provides structural support to the conveyor 26. As will be appreciated, the reinforcing plate 40 may be attached to the conveyor 26 via a welded connection or an adhesive bond, for example.

An actuating cylinder 42 is rotatably coupled to the reinforcing plate 40, such as by using one or more fasteners. The actuating cylinder 42 includes a piston rod 44 that extends from the cylinder 42 to a rod mount 46 on a bracket 48. As illustrated, the bracket 48 is rotatably coupled to the reinforcing plate 40. The bracket 48 is also coupled to the hopper 30 via a linkage. In this configuration, extension of the piston rod 44 drives the bracket 48 to rotate the hopper 30 toward the storage position, and retraction of the piston rod 44 drives the bracket 48 to rotate the hopper 30 toward the working position 33. As will be appreciated, the actuating cylinder 42 may be a hydraulic cylinder, a pneumatic cylinder, or another suitable actuator for rotating the hopper 30 between the working and storage positions.

In the illustrated embodiment, the conveying system 14 includes an interface section 50 extending between the conveyor 26 and the hopper 30. The interface section 50 includes the first end 34 of the hopper 30, and the end 35 of the conveyor 26, which are configured to couple to one another.

The interface section 50 also includes a first seal 52 coupled to the end 35 of the conveyor 26, and configured to facilitate product flow from the hopper 30 to the conveyor 26. Further, the interface section 50 includes a first auger end 54 configured to couple the conveyor auger to the hopper auger such that rotation of the conveyor auger drives the hopper auger to rotate. The interface section 50 also includes a second seal 56 coupled to the end 34 of the hopper 30. In addition, the interface section 50 includes a second auger end 58 coupled to the hopper auger, and configured to engage the first auger end 54, thereby coupling the augers to one another. While the hopper 30 is in the working position 33, the seals 52 and 56 press against each other to substantially seal agricultural product within the product conveying system 14, and to keep contaminants out of the product conveying system 14. The seals 52 and 56 may be manufactured from suitable material. For example, the seals 52 and 56 may be manufactured from a polymeric material such as polychloroprene.

With the hopper 30 oriented in the illustrated position, product remaining within the conveyor 26 and the hopper 30 may fall toward the second side 36 of the hopper 30. The v-shaped configuration of the second side 36 of the hopper 30 channels the product out of the hopper 30, such as into a pail that may be attached to the hopper 30. Consequently, as the hopper 30 rotates from the working position 33 to the storage position, product falls out of the hopper 30 and the conveyor 26 (e.g., toward a ground surface 59), thereby keeping the components of the hopper 30 and the conveyor 26 clean. As such, cleaning time of the conveying system 14 may be reduced and, therefore, operational costs may be reduced.

Figure 3:
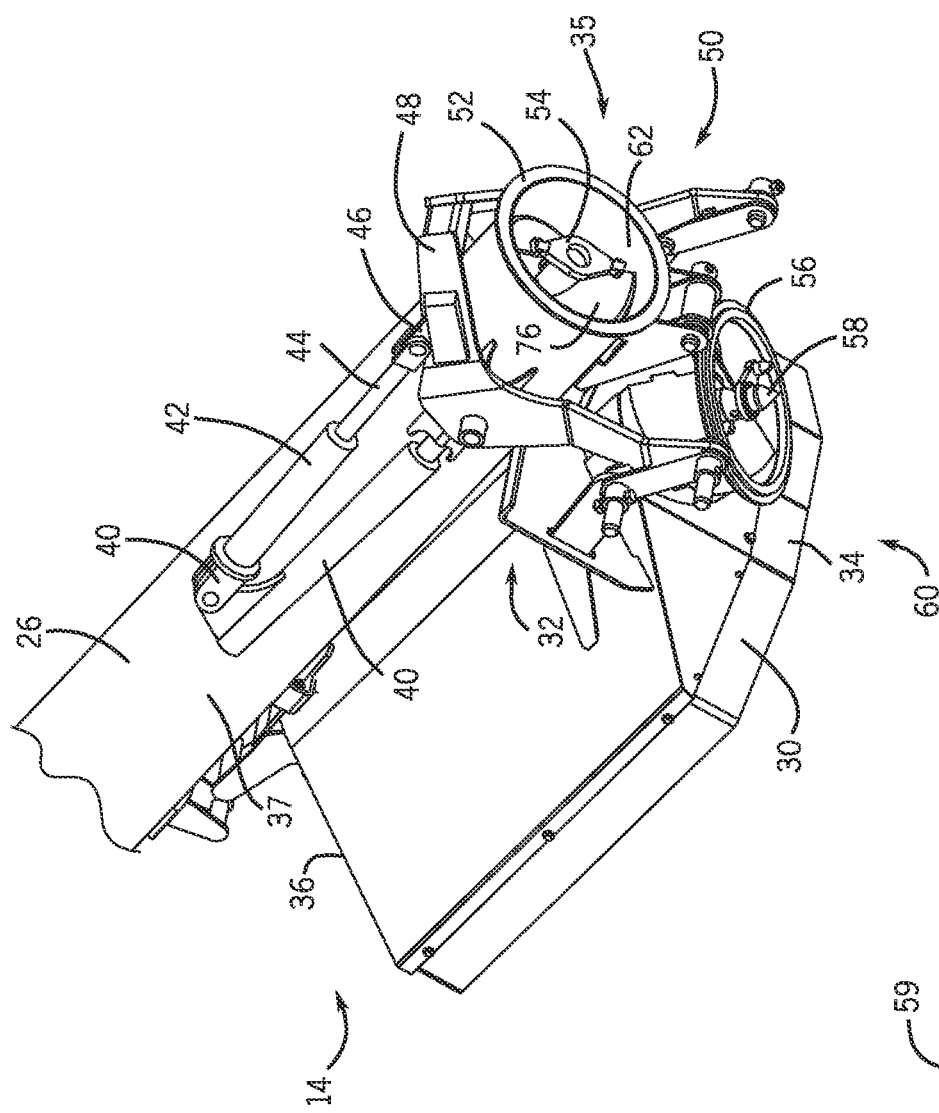
FIG. 3 is a perspective view of the product conveying system of FIG. 2, in which the hopper is folded into a storage position.

FIG. 3 is a perspective view of the product conveying system 14 of FIG. 2, in which the hopper 30 is folded into a storage position 60. As previously mentioned, the hopper 30 may be folded into the storage position 60 via extension of the piston rod 44. In certain embodiments, the force applied by the actuating cylinder 42 also holds the hopper 30 in the storage position 60. In the illustrated embodiment, the conveyor 26 includes an opening 62 that facilitates product flow between the hopper 30 and the conveyor 26. While the hopper 30 is in the working position 33, product may flow from the hopper 30 to the conveyor 26 through the opening 62. Conversely, while the hopper 30 is in the storage or folded position 60, as illustrated, remaining product within the conveyor 26 may exit the conveyor 26 through the opening 62. Further, water and/or other external contaminants, which may enter the conveyor 26 through the guide tube 28, may exit the conveyor 26 through the opening 62. In addition, as the hopper 30 folds under the conveyor 26, product remaining within the hopper 30 may exit the hopper 30. Further, because the opening in the hopper 30 faces downwardly while the hopper 30 is in the storage position 60, the possibility of external contaminants accumulating within the hopper 30 is substantially reduced.

Moreover, during operation of the air cart 12, external contaminants and/or remaining material may shake out of the hopper 30 and/or the conveyor 26 while the hopper 30 is in the storage position 60. It should be noted that the product conveying system 14 may be used to convey products that could degrade parts of the system 14 if left on those parts for certain periods of time. For example, product may contain corrosive chemicals that can cause excessive wear on the conveyor 26, the hopper 30, and/or the folding assembly 32. Therefore, removing product from the product conveying system 14 may increase the longevity of the product conveying system 14. It will be appreciated that in embodiments in which a hopper 30 is positioned above the conveyor 26 and the hopper 30 opening faces downward, product may fall out of the hopper 30 onto the conveyor 26 and cause excessive wear on the conveyor 26. Conversely, in the present embodiments, with the hopper 30 positioned below the conveyor 26 and the hopper 30 opening facing downward, product will fall out of the hopper 30 onto the ground 59. Further, as may be appreciated, in the storage position product falls out of the hopper 30 and the conveyor 26, thereby keeping the components of the hopper 30 and the conveyor 26 clean. As such, cleaning time of the conveying system 14 may be reduced and, therefore, operational costs may be reduced. In addition, external contaminant buildup within the hopper 30 is reduced because the hopper 30 opening faces downwardly.

Figure 4:
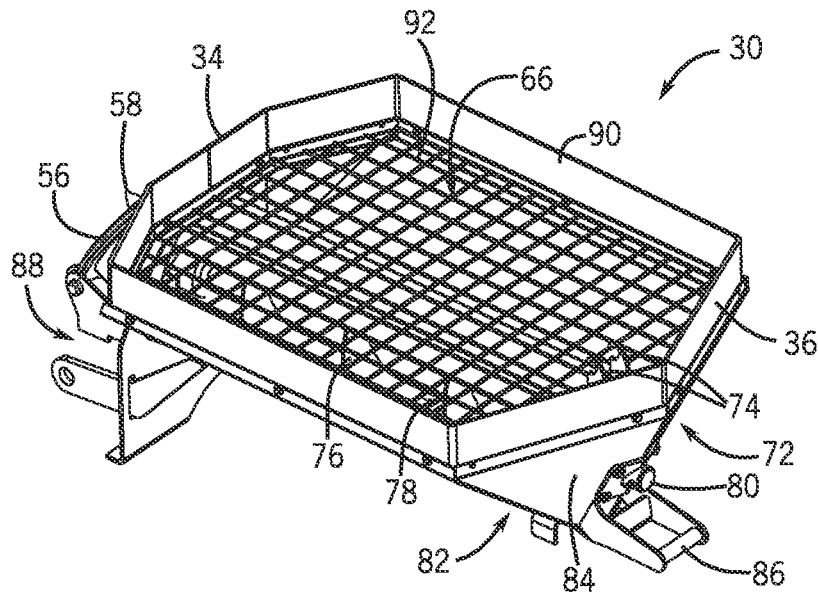
FIG. 4 is a perspective view of an embodiment of a hopper with a v-shaped end.

FIG. 4 is a perspective view of an embodiment of a hopper 30 with a v-shaped end. The hopper 30 has an opening 66 for receiving product into the hopper 30. As illustrated, the first side 34 defines a first end of the opening 66, and the second side 36 defines an opposite end of the opening 66. The first side 34 of the hopper 30 interfaces with the conveyor 26, as previously described. The second side 36 of the hopper 30 includes a v-shaped end 72. The v-shaped end 72 channels product toward the opening 66 as the hopper 30 rotates from the working position 33 to the storage position 60.

As illustrated, the hopper 30 includes hooks 74 extending into the opening 66 adjacent to the second side 36 of the hopper 30. The hooks 74 are configured to hold a container, such as a pail, which may receive product that is channeled out of the hopper 30 by the v-shaped end 72. For example, a pail may be attached to the hopper 30 while the hopper 33 is in the working position 33. As the hopper 30 is folded toward the storage position 60, the second end 36 moves toward the ground, thereby directing the remaining product toward the second end 36. The v-shaped end 72 acts as a funnel to direct the product into the pail. Further, because the pail may rotate relative to the hopper 30, the pail remains under the second end 36 of the hopper 30 as the hopper 30 is folded toward the storage position 60.

The hopper 30 includes an auger 76 within an internal portion 78 of the hopper 30. The auger 76 is configured to move product from the hopper 30 to the conveyor 26 via rotation of the auger 76. In certain embodiments, a belt system may be used in place of the auger 76 to move product from the hopper 30 to the conveyor 26. The auger end 58 is configured to couple with the auger end 54 of the conveyor auger such that rotation of the conveyor auger drives the hopper auger to rotate. Further, the auger 76 is coupled to a bearing assembly 80 located on an external portion 82 of the hopper 30. Thus, the bearing assembly 80 is physically separated from the internal portion 78 of the hopper 30. As such, the possibility of product from the hopper 30 entering the bearing assembly 80 is substantially reduced or eliminated. As will be appreciated, the bearing assembly 80 facilitates rotation of the auger 76.

The v-shaped end 72 of the hopper 30 is formed by a front panel 84. As illustrated, a locking mechanism 86 is mounted to the front panel 84, and is configured to lock the hopper 30 in the storage position 60 upon contact between the hopper 30 and the conveyor 26. When locked to the conveyor 26, the locking mechanism 86 holds the hopper 30 under the conveyor 26 while a latch on the conveyor 26 engages the locking mechanism 86. The product conveying system 14 also includes mounting brackets 88 coupled to the first side 34 of the hopper 30, and configured to mount the hopper 30 to the folding assembly 32. In certain configurations, the hopper 30 includes a rim extension 90 that extends the upper edge of the hopper 30 above a grate 92. The rim extension 90 serves to keep product within the hopper 30 when the product level exceeds the grate height. It should be noted that the grate 92 may be used to keep large objects from entering the internal portion 78 of the hopper 30, thereby substantially reducing the possibility of mixing the large objects with the product.

Figure 5:
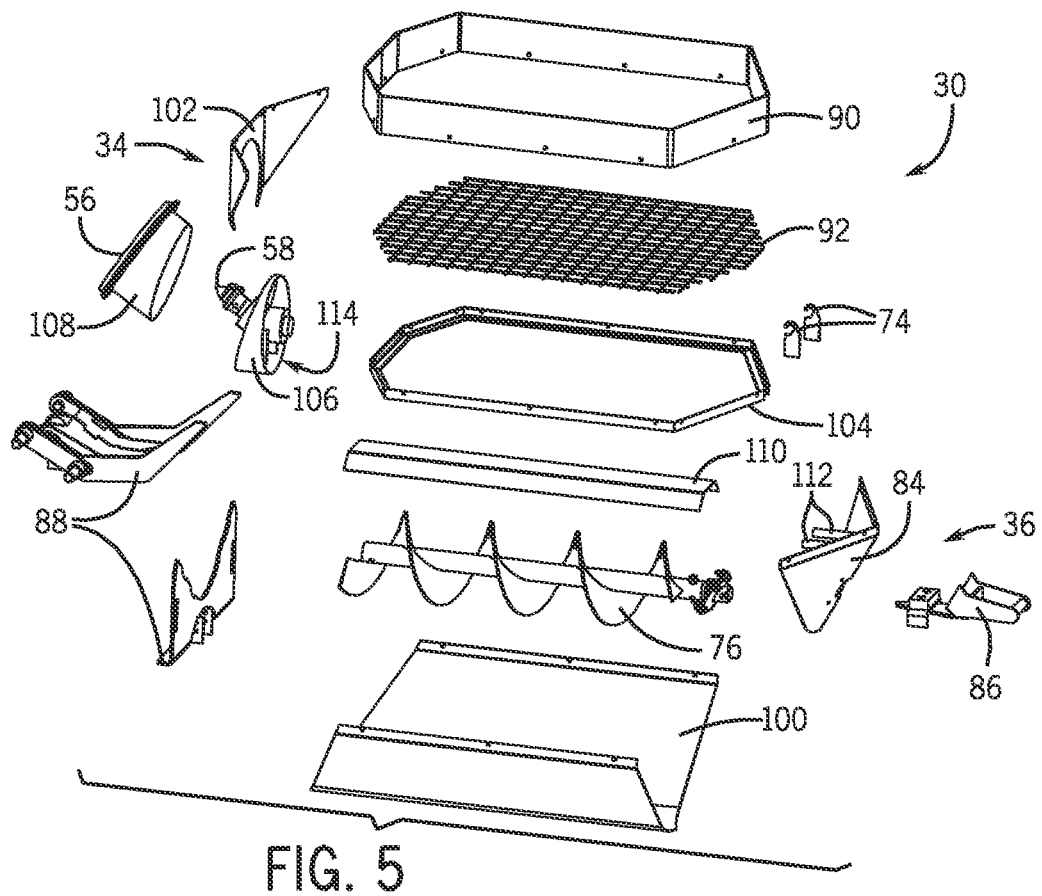
FIG. 5 is an exploded view of the hopper of FIG. 4.

FIG. 5 is an exploded view of the hopper 30 of FIG. 4. As illustrated, the hopper 30 includes a bottom portion 100 that is configured to hold product received by the hopper 30. On the first side 34 of the hopper 30, a back panel 102 and the mounting brackets 88 are attached to the bottom portion 100, thereby forming the first side 34. At the second side 36, the front panel 84 abuts the bottom portion 100. A rim 104 is attached to the upper edges of the bottom portion 100, the back panel 102, and the front panel 84 to hold the components together. The rim 104 may be attached to the upper edges of the bottom portion 100, the back panel 102, and the front panel 84 by crimping, welding, or using fasteners to secure the components together. As illustrated, the locking mechanism 86 is coupled to the bottom portion 100 such that the mechanism 86 extends outwardly from the front panel 84. As previously discussed, the locking mechanism 86 locks the hopper 30 into the storage position.

The auger 76 is disposed within the internal portion 78 of the hopper 30. During operation, the auger 76 rotates to move product from the hopper 30 to the conveyor 26. A first coupling device 106, which includes the auger end 58, is attached to the opening formed by the mounting brackets 88 and the back panel 102. The auger end 58 is coupled to the auger 76 such that rotation of the auger end 58 drives the auger 76 to rotate. As previously discussed, the auger end 58 interfaces with the auger of the conveyor 26, and is configured to induce the auger 76 of the hopper 30 and the auger of the conveyor 26 to rotate together.

A second coupling device 108, which includes the seal 56, is coupled to the first coupling device 106. The seal 56 is configured to interface with the seal 52 of the conveyor 26. In certain embodiments, a deflector panel 110 may be disposed over the auger 76 to block product from falling directly onto the auger 76. As illustrated, the deflector panel 110 may be coupled to extensions 112 protruding from the front panel 84, and to a portion 114 of the first side 34 of the hopper 30. Further, the hooks 74 may be coupled to the deflector panel 110. The hooks 74 are configured to extend from the hopper 30 to facilitate attachment of a pail to the hopper 30. The grate 92 is inserted into the hopper 30 and the rim extension 90 is attached to the rim 104. In certain configurations, the rim extension 90 is secured by compression between the rim extension 90 and the rim 104. As may be appreciated, the v-shaped end 72 acts as a funnel to direct the product out of the hopper 30 and into the pail. Thus, a greater amount of product is conserved in the pail and not wasted by falling to the ground.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural system comprising:
   a hopper configured to receive product; and
   a conveyor configured to move the product from the hopper to a holding container, wherein the hopper is configured to fold under the conveyor into a storage position that directs an opening in the hopper toward a soil surface.

2. The agricultural system of claim 1, comprising an interface section extending between the conveyor and the hopper, wherein the interface section comprises a seal configured to facilitate flow of the product from the hopper to the conveyor.

3. The agricultural system of claim 1, wherein the hopper comprises a first auger configured to move the product from the hopper to the conveyor via rotation of the first auger.

4. The agricultural system of claim 3, wherein the first auger is configured to couple to a second auger in the conveyor such that rotation of the second auger drives the first auger to rotate.

5. The agricultural system of claim 1, comprising a folding assembly having an actuating cylinder configured to rotate the hopper between the storage position and a working position that directs the opening in the hopper upwardly.

6. The agricultural system of claim 1, comprising a folding assembly having an actuating cylinder with a piston rod, wherein the actuating cylinder is configured to extend the piston rod to rotate the hopper toward the storage position, and to retract the piston rod to rotate the hopper toward a working position that directs the opening in the hopper upwardly.

7. The agricultural system of claim 6, wherein the folding assembly comprises a reinforcing plate coupled to the conveyer, and configured to support the actuating cylinder.

8. An agricultural system comprising:
a hopper configured to receive product;
a conveyor configured to move the product from the hopper to a holding container; and
a folding assembly configured to fold the hopper under the conveyor into a storage position that directs an opening in the hopper toward a soil surface.

9. The agricultural system of claim 8, comprising an interface section extending between the conveyor and the hopper, wherein the interface section comprises a seal configured to facilitate flow of the product from the hopper to the conveyor.

10. The agricultural system of claim 8, wherein the hopper comprises a first auger configured to move the product from the hopper to the conveyor via rotation of the first auger.

11. The agricultural system of claim 10, wherein the first auger is configured to couple to a second auger in the conveyor such that rotation of the second auger drives the first auger to rotate.

12. The agricultural system of claim 8, wherein the folding assembly comprises an actuating cylinder configured to rotate the hopper between the storage position and a working position that directs the opening in the hopper upwardly.

13. The agricultural system of claim 8, wherein the folding assembly comprises an actuating cylinder with a piston rod, wherein the actuating cylinder is configured to extend the piston rod to rotate the hopper toward the storage position, and to retract the piston rod to rotate the hopper toward a working position that directs the opening in the hopper upwardly.

14. The agricultural system of claim 13, wherein the folding assembly comprises a reinforcing plate coupled to the conveyer, and configured to support the actuating cylinder.

15. An agricultural system comprising:
a hopper configured to transition between a working position that directs an opening in the hopper upwardly to facilitate receiving product, and a storage position that directs the opening in the hopper toward a soil surface to facilitate flow of the product out of the hopper;
a conveyor configured to move the product from the hopper to a holding container while the hopper is in the working position; and
a folding assembly configured to fold the hopper under the conveyor into the storage position.

16. The agricultural system of claim 15, comprising an interface section extending between the conveyor and the hopper, wherein the interface section comprises a seal configured to facilitate flow of the product from the hopper to the conveyor.

17. The agricultural system of claim 15, wherein the hopper comprises a first auger configured to move the product from the hopper to the conveyor via rotation of the first auger.

18. The agricultural system of claim 17, wherein the first auger is configured to couple to a second auger in the conveyor such that rotation of the second auger drives the first auger to rotate.

19. The agricultural system of claim 15, wherein the folding assembly comprises an actuating cylinder with a piston rod, wherein the actuating cylinder is configured to extend the piston rod to rotate the hopper toward the storage position, and to retract the piston rod to rotate the hopper toward the working position.

20. The agricultural system of claim 19, wherein the folding assembly comprises a reinforcing plate coupled to the conveyer, and configured to support the actuating cylinder.

* * * * *